United States Patent [19]

Reinartz

[11] Patent Number: 5,460,122
[45] Date of Patent: Oct. 24, 1995

[54] SELF CLEANING KITTY LITTER BOX HAVING A MOVABLE FLOOR

[76] Inventor: Johann O. Reinartz, Endstrasse 55, 5144 Wegberg-Arsbeck, Germany

[21] Appl. No.: 969,285
[22] PCT Filed: May 15, 1992
[86] PCT No.: PCT/DE92/00781
  § 371 Date: May 3, 1993
  § 102(e) Date: May 3, 1993
[87] PCT Pub. No.: WO93/22904
  PCT Pub. Date: Nov. 25, 1993
[51] Int. Cl.$^6$ .................................................. A01K 1/035
[52] U.S. Cl. .................................................. 119/164; 119/165
[58] Field of Search .................................. 119/162, 163, 119/161, 164, 165, 166

[56] References Cited

U.S. PATENT DOCUMENTS

| | | | |
|---|---|---|---|
| 3,747,563 | 7/1973 | Brockhouse | 119/163 |
| 3,954,086 | 5/1976 | Maness | 119/163 |
| 4,465,018 | 8/1984 | Mopper | 119/164 |
| 4,844,011 | 7/1989 | Strickland | 119/164 |
| 4,854,267 | 8/1989 | Morrow | 119/161 |
| 4,934,317 | 6/1990 | Pourshalchi | 119/165 |
| 5,003,920 | 4/1991 | Miksitz | 119/163 |
| 5,107,797 | 4/1992 | LaRoche | 119/163 |

FOREIGN PATENT DOCUMENTS

| | | | |
|---|---|---|---|
| 2648313 | 12/1990 | France | 119/165 |

Primary Examiner—Gene Mancene
Assistant Examiner—Todd E. Manahan
Attorney, Agent, or Firm—Burns, Doane, Swecker & Mathis

[57] ABSTRACT

A sanitary device for cats includes a rectangular, tub-like lower part that has opposite sides and is open at the top and has an opening across an entire right width on a right, narrow side thereof. The device further includes a second rectangular part that is placed on top of the lower part and is open to the top and bottom side. A drawer that is suitable for holding an exchangeable, disposable cassette is located in the lower part. An exchangeable, flexible floor has a lower side and permeating fingers on the lower side for distributing used kitty litter into the disposable cassette. The floor also has cogged wheels on the lower side. A separate supply tower, designed to hold fresh kitty litter, is secured to a side of the lower part and has a dosaging device in a lower part of a side facing the lower part. Furthermore, a groove is situated along an entire length of the lower part on each of the opposite sides for receiving and guiding the flexible floor.

13 Claims, 2 Drawing Sheets

SELF CLEANING KITTY LITTER BOX HAVING A MOVABLE FLOOR

BACKGROUND OF THE INVENTION

1. Field of the Invention

The invention relates to a sanitary device for cats, and more particularly, a cat toilet with automatic cleaning and replenishment of kitty litter.

2. Description of Related Art

All cat toilets that have been commercially available for years have had to be cleaned by hand. At least once or twice a day, the kitty litter that has been soiled with fecal material has to be tossed out entirely or the fecal materials must be removed individually by means of a specially designed shovel, which is also commercially available.

The resulting odor, which appears despite the odor-inhibiting kitty litter, should be viewed as a disadvantage of that cat toilet.

A cat toilet with automatic cleaning and replenishment has been disclosed in German P 39 18 121.9-23, and its corresponding U.S. Pat. No. 5,184,575. A more detailed discussion of this is, however, not necessary because both cleaning, as well as replenishment, are solved with means other than those described therein.

Other cat toilets that are self-cleaning are disclosed in DE-GM 89 05 314, as well as in DE-GM 84 19 845. The disadvantages of those cat toilets are explained in P 39 18 121.9-23.

Because it does not matter to a cat if it is left alone at home for a temporary period of time, the number of pet cats in the households of working people has increased enormously in the past few years. Given this circumstance, and recognizing the cleanliness of cats, if cats are left alone for long periods of time, there exists the danger that a cat, if it does not consider its toilet to be clean enough, will do its "business" in another place in the home that the cat considers suitable for such purposes.

SUMMARY AND OBJECTS OF THE DISCLOSURE

An object of the present invention is to provide a cat toilet that, on the one hand, meets most modern requirements of keeping pets, to the benefit of the pet, as well as takes into account hygiene and human comfort.

This object is accomplished by the present invention because it provides a sanitary device for cats, i.e., a cat toilet, which automatically cleans itself after every use and provides for fresh kitty litter.

A cat toilet according to the present invention includes a frame; a flexible floor supported by said frame; a supply tower mounted at one end of said frame above said floor; and means for moving said floor between a first position, in which the toilet can be used by a cat, and a second retracted position; said supply tower having an open end positioned above said floor such that when said floor moves from the first position to the second retracted position, kitty litter on the floor is pushed off of the floor, and as the floor moves from the second retracted position to the first position, kitty litter is deposited onto the floor from the open end of the supply tower.

The present invention further includes a method of cleaning a cat toilet having a retractable floor below a supply tower, comprising the steps of retracting the floor from a first position to a retracted position; pushing kitty litter off the floor by kitty litter in the supply tower while the floor is being retracted; returning the floor to the first position; and depositing kitty litter from the supply tower onto the floor while the floor is returning to the initial position.

DETAILED DESCRIPTION OF A PREFERRED EMBODIMENT

Figure 1:
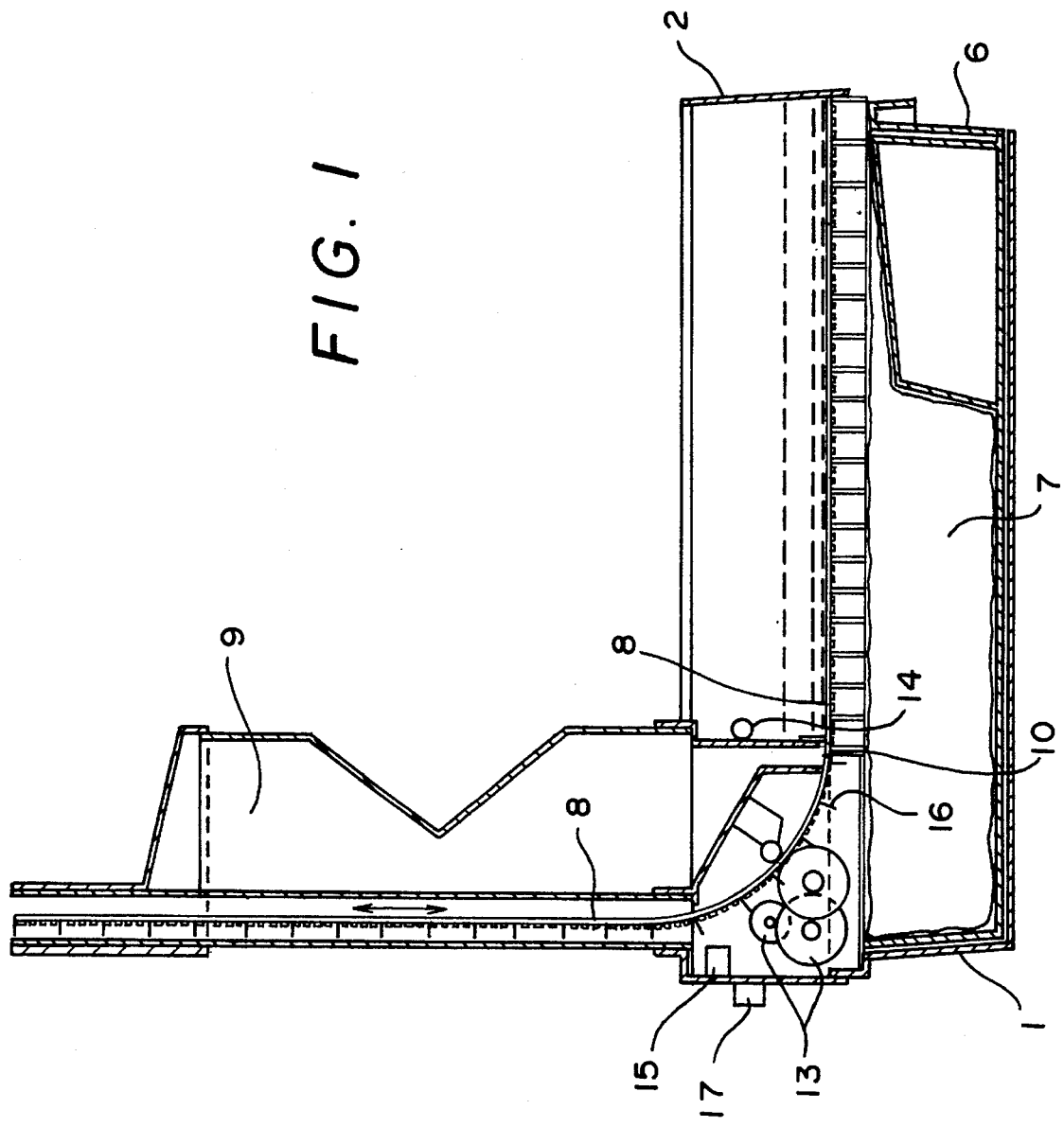
FIG. 1 is a cross-sectional view of the cat toilet of the present invention.
Figure 2:
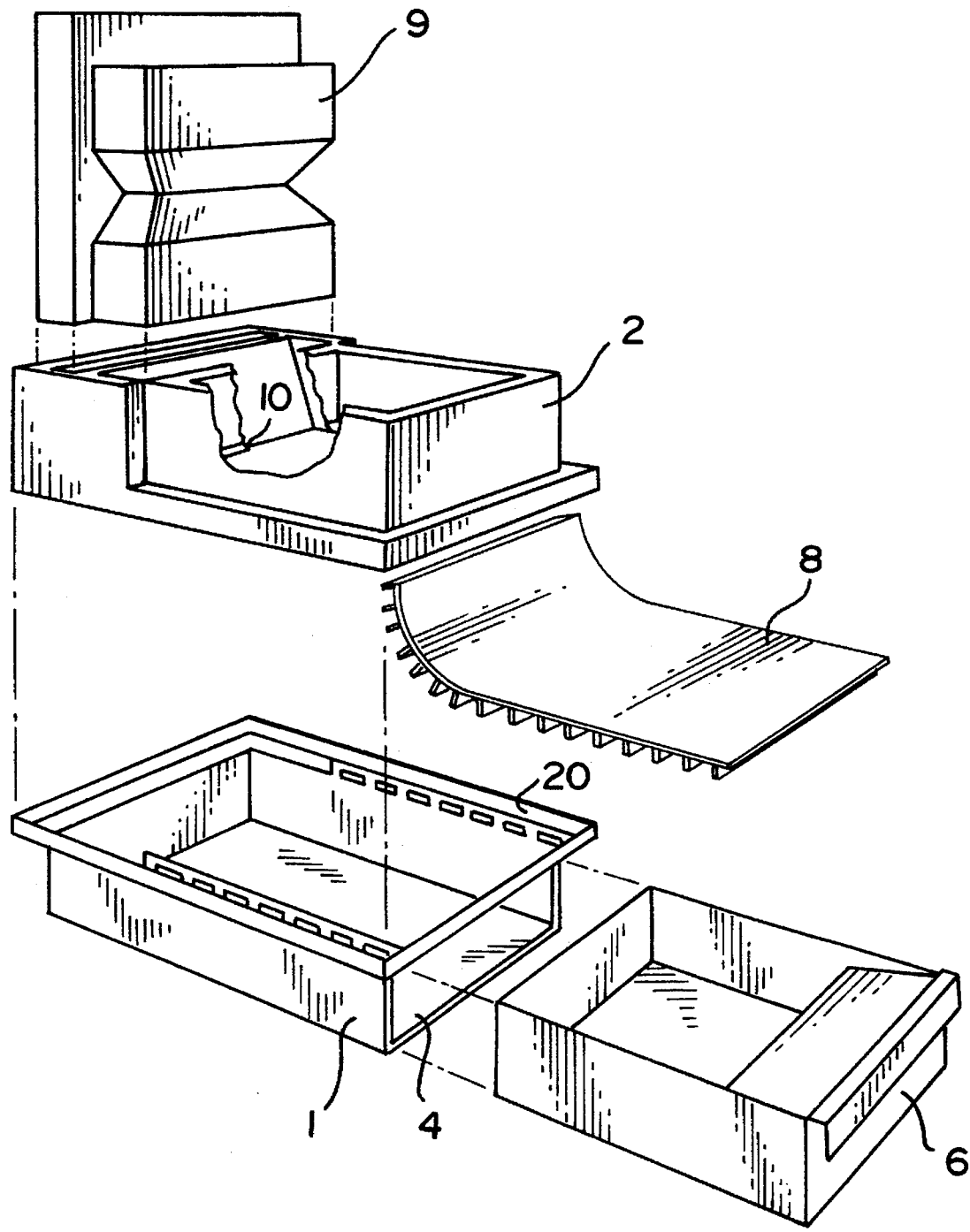
FIG. 2 is an exploded perspective view of the major components of the cat toilet of FIG. 1.

One embodiment of the present invention is illustrated in the drawing.

A cat toilet has two rectangular parts that are placed on top of each other, a drawer, a separate supply tower with a dosaging device, and a flexible, exchangeable floor.

The rectangular lower part 1 has an open top, and an opening 4 going across the entire width on the narrow right side, through which a separate lower portion 6 that is suitable for supporting an exchangeable supply cassette 7 can be pushed into the lower portion 1.

A second, similarly rectangular part 2 is placed on top of the lower part 1 and has an open top and back. A flexible, exchangeable floor 8 is located between the lower part 1 and the upper part 2 in a groove 20. On its underside it has permeating fingers and cogged wheels on both longer sides.

A supply tower 9, which is designed to hold fresh kitty litter and which has a lower side that is slanted, is secured to the left side of the lower part 2 by means of a device that is suitable for this purpose.

A dosaging device 10 is located in the slanted lower portion of the supply tower 9. Sensors 14 are installed in the supply tower 9. The sensors 14 may be of any type known to those of ordinary skill in the art.

The sensors 14 detect both the entry as well as the departure of the cat into and out of the cat toilet. Once the cat has departed the cat toilet, the cleaning and replenishment process begins after a predetermined time delay.

After the sensors detect that a cat has entered and left the cat toilet, a predetermined delay period is counted. After the elapse of the delay period, the flexible floor 8, which has cogged wheels at both sides thereof, is drawn along the slanted edge of the supply tower and up behind the supply tower by means of two cogged wheels 13, which turn in directions counter to each other. A motor 15 drives the cogged wheels 13. As the floor 8 is moved up behind the supply tower, fresh kitty litter at the base of the slanted lower portion of the tower pushes the used kitty litter off of the floor 8 into the exchangeable disposable cassette 7 that is located in the drawer. That action cleans the floor 8.

After the floor is completely retracted, the motor is reversed to return the floor to its initial position. As a result of the forward motion, the cleaned flexible floor is supplied with fresh kitty litter from the supply tower, the amount of which can be regulated by means of the dosaging device 10. The dosaging device can be regulated by raising or lowering the dosaging device.

Simultaneously, permeating fingers 16 extending from a lower surface of the floor distribute the used kitty litter into the disposable cassette. Specifically, the fingers 16 distribute used kitty litter already present in the cassette so that the used kitty litter will not clog the opening through which the used kitty litter falls into the cassette.

Once the flexible floor 8 has resumed its initial position, the cat toilet can be used once again.

The process described above is driven by a geared motor 15 and is activated and controlled by the sensors 14 and a control unit 17 by means well known to those of ordinary skill in the art. Energy for the motor is preferably supplied by batteries (not shown). Although, other sources of energy, such as household current, can be used.

As indicated by the example described above, the cat toilet does not have to be cleaned by hand. The used kitty litter is enclosed, air-tight, in the drawer and can be easily removed by means of the exchangeable, disposable cassette without having to come into direct contact with the fecal material.

Although only exemplary preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. A sanitary device for cats, comprising:

a rectangular, tub-like lower part that has opposite sides and is open at the top and that has an opening across an entire width on a right, narrow side;

a second rectangular part that is placed on top of the lower part and that is open to the top and bottom side;

a drawer that is suitable for holding an exchangeable, disposable cassette, said drawer being located in said lower part;

an exchangeable flexible floor that has a lower side and that has permeating fingers on the lower side for distributing used kitty litter into the disposable cassette, the floor further has cogged wheels on the lower side;

a separate supply tower designed to hold fresh kitty litter and which is secured to a side of the lower part and which has a dosaging device in a lower portion of a side facing the lower part; and a groove situated along an entire length of the lower part on each of said opposite sides for receiving and guiding the flexible floor.

2. The sanitary device of claim 1, wherein the lower part is made of plastic.

3. The sanitary device of claim 2, wherein the drawer fits in the opening of the lower part.

4. The sanitary device of claim 1, further including means for moving the flexible floor upward through the supply tower and back by means of the cogged wheels and for distributing kitty litter onto the floor when it is moved back.

5. The sanitary device of claim 1, further including sensors in the supply tower for activating the movement of the floor and the distribution of kitty litter.

6. The sanitary device of claim 1, wherein the dosaging device can be regulated to control the amount of kitty litter distributed onto the floor.

7. A cat toilet, comprising:

a frame;

a flexible floor supported by said frame;

a supply tower mounted at one end of said frame above said floor;

means for moving said floor between a first configuration in a first position, in which the toilet can be used by a cat, and a second configuration in a second retracted position;

said supply tower having an open end positioned above said floor such that when said floor moves from the first position to the second retracted position, kitty litter on the floor is pushed off of the floor, and as the floor moves from the second retracted position to the first position, kitty litter is deposited onto the floor from the open end of the supply tower; and fingers extending from a lower side of said floor.

8. The cat toilet of claim 7, further comprising an adjustable dosaging device on said supply tower for regulating an amount of kitty litter to be deposited onto the floor.

9. The cat toilet of claim 7, further comprising sensors for detecting when a cat enters and departs from the cat toilet.

10. The cat toilet of claim 7, further comprising a drawer within said frame for collecting kitty litter pushed off of said floor.

11. A method of cleaning a cat toilet having a retractable flexible floor below a supply tower, comprising the steps of:

retracting the floor from a first configuration in a first position to a second configuration in a retracted position;

pushing kitty litter off the floor by kitty litter in the supply tower while the floor is being retracted;

returning the floor to the first configuration in the first position;

depositing kitty litter from the supply tower onto the floor while the floor is returning to the first position;

collecting kitty litter that is pushed off the floor in a cassette that is located below the floor; and distributing the kitty litter in the cassette below the floor with fingers extending from a lower side of the floor.

12. The method of claim 11, further comprising the steps of sensing when a cat has used the cat toilet and waiting a predetermined period of time after the cat has used the toilet prior to retracting the floor.

13. The method of claim 11, further comprising the step of regulating the amount of kitty litter deposited on the floor by adjusting a regulating device on the supply tower.

* * * * *